No. 658,302. Patented Sept. 18, 1900.
C. VAN GYN.
DISCONNECTING GEAR FOR SHAFT COUPLINGS.
(Application filed Dec. 29, 1899.)

(No Model.)

Witnesses:

Inventor
Casper Van Gyn
By James L. Norris.
Atty.

UNITED STATES PATENT OFFICE.

CASPER VAN GYN, OF WILLEMSOORD, NETHERLANDS.

DISCONNECTING-GEAR FOR SHAFT-COUPLINGS.

SPECIFICATION forming part of Letters Patent No. 658,302, dated September 18, 1900.

Application filed December 29, 1899. Serial No. 741,992. (No model.)

*To all whom it may concern:*

Be it known that I, CASPER VAN GYN, a subject of the Queen of the Netherlands, residing at Willemsoord, Netherlands, have invented certain new and useful Improvements in Disconnecting-Gears for Shaft-Couplings, (for which I have applied for patents in England, No. 23,453, dated November 24, 1899; in France, dated November 23, 1899; in Belgium, dated November 23, 1899, and in Germany, dated March 28, 1899,) of which the following is a specification.

The object of this invention is a disconnecting device for couplings, the peculiar construction of which is such that an immediate stoppage of the disconnecting part takes place without concussion, a cone mounted on the driving-shaft and controlled by a spring releasing suddenly, under the action of the spring, that part of the coupling which is held by clamps or claws.

The accompanying drawings show one manner of carrying out the subject-matter of this invention.

Figure 1:
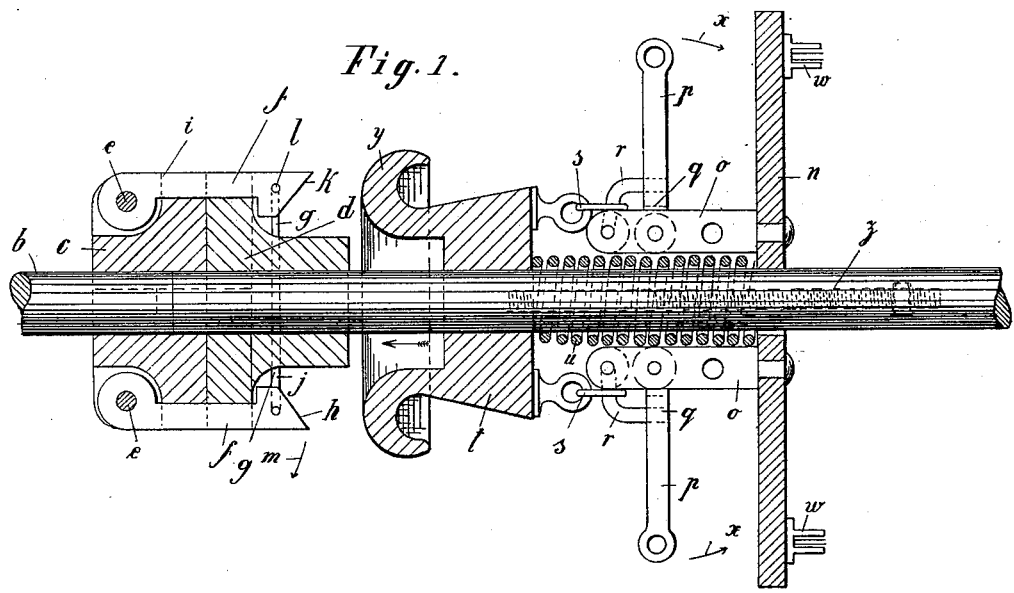
Figure 2:
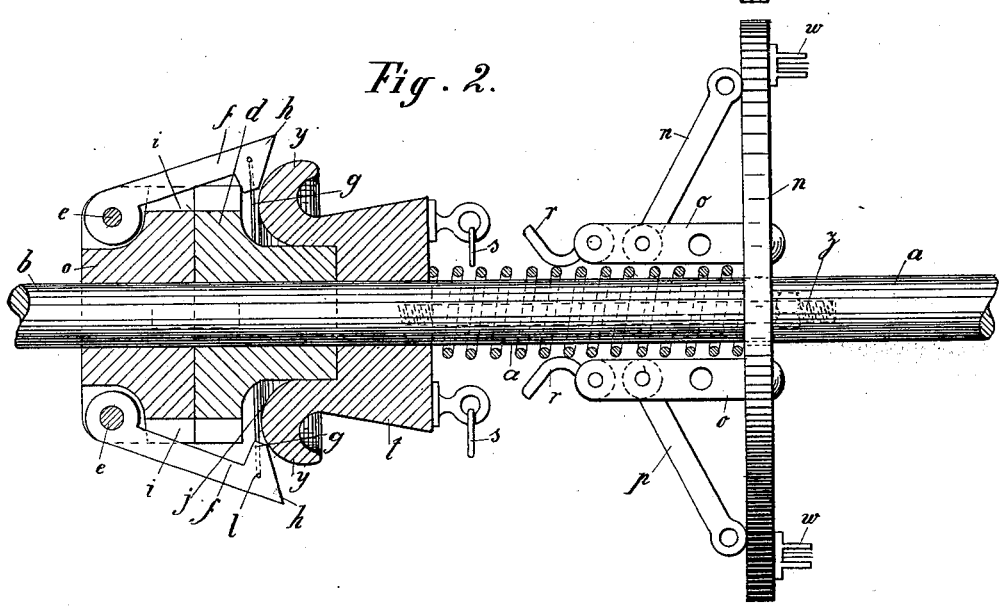

Figure 1 is a longitudinal section showing the cone in a stretched or cocked position. Fig. 2 is a longitudinal section of the coupling disconnected.

On the shafting $a$ and $b$, of which $a$ is the driving-shaft and $b$ the shaft required to be set in rotation, the coupling members or parts $c$ and $d$ are fixed. The coupling member $c$ is mounted on the shaft required to be driven and carries around or upon the bolts, fixed to the outer edge of the same, pawls $f$, capable of turning about these bolts. The free ends of the pawls $f$ are provided with a projection $g$, arranged radially to the center of the shaft, so that the front end surfaces $h$ of the pawls $f$ become longer or larger and are placed accordingly in an angular position relatively to the longitudinal direction of the pawls $f$, and thus present a suitable sliding-off surface or plane. The pawls $f$ in the course of their length, throughout which they may have, for instance, a rectangular sectional shape, are located in grooves $i$, formed in the edge of the coupling members $c$ and $d$ in a position which is parallel to the shaft whenever the shafts $a$ and $b$ are firmly coupled together. The grooves $i$, which are symmetrically arranged in the coupling members relatively to the same, together with the pawls $f$, may be provided in suitable numbers, according to the size of the coupling. When the shafts $a$ and $b$ are coupled, so that the front surfaces of the two coupling members bear tightly one against the other, and the pawls $f$ are located in their grooves $i$, the projection or rod $g$ of the pawls presents a resistance to the drawing back or disconnection of coupling. The pawls $f$ are held in a parallel position to the shaft by means of a breakable copper wire $j$ or other suitable resilient device. This copper wire $j$ or the other device used must be passed through a hole formed in the free end of the pawls $f$ and must be slack in such a manner that the turning of the pawls about the centers $e$ in the direction indicated by the arrow $m$ can be effected to such an extent as to release the coupling member of the shaft $a$. At a suitable distance behind the coupling member $d$ is arranged a plate $n$, which can be held in a proper position by means of bars $o$, secured to hinges or other fixing means on the same plate, either against the wall or under the roof, but over the shaft wherever the same may be set up. It may be preferable to form this plate $n$ of two parts, so they may be laid over the shaft without releasing either the coupling or the bearings of the same shaft, although this plate is not connected to the shaft. Bars $o$ are fixed to these plates and serve to carry the levers $p$. These levers $p$ are movably secured to the bars $o$ and are furnished with holes $q$, wherein enter the ends of pins $r$, jointed to the said bars $o$ and bent to a suitable angle. These pins $r$, thus jointed to the bars $o$, serve to hold by means of the chain-like connections or links $s$ the disconnecting-cone $t$. The spiral spring $u$, arranged between the plate $n$ and the said disconnecting-cone $t$, has a tendency to suddenly push the cone $t$ in the direction indicated by the arrow $v$, when, as soon as, in consequence of the turning of the lever $p$ in the direction indicated by the arrow $x$, the pin $r$ is released from the holes $q$, this cone is accordingly released. The levers $p$ are provided with arms similar to bell-crank levers at their free ends, which are actuated by draw-rods in the same manner as the well-known disconnecting-forks for sets of pulleys are manipulated from the ground by means of draw-rods.

When the disconnecting-cone $t$ is impelled against the coupling member $d$, fixed on the shaft $a$, the peculiarly-formed front surface $y$ comes in contact with the front surface $h$ of the pawls $f$, and under the timely pressure of the spring and in consequence of the bevel or angular front surface $h$ of the pawls $f$ the latter are moved in the direction indicated by the arrow $m$ until, as clearly shown in Fig. 2, the coupling member $d$ is released and no connection can take place with the coupling member $c$, mounted on the shaft $b$. According to the stiffness of the spring and in consequence of the uniform raising of the members due to the bevel front surfaces $h$ the disconnection of the couplings is effected instantaneously and without the slightest shock or vibration, which is a great advantage in the weaving or spinning industries, for instance. To connect again the severed coupling members, the disconnecting-cone $t$ must be withdrawn by means of the screw $z$, which causes the pawls $f$ to be brought back in their position of parallelism to the shaft. As the cone $t$ is being withdrawn the plate $n$ serves as a bearing for the nut of the screw $z$. The motion of the levers $p$ may be facilitated by the attachment thereto of a counterweight, as is done generally for the disconnecting parts of gears.

A brake for stopping the released part is entirely unnecessary, as in consequence of the slipping-off motion of the front surfaces $h$ of the pawls against the parts $y$ of the disconnecting-cone $t$ sufficient resistance is developed for stopping the parts.

What I claim, and desire to secure by Letters Patent of the United States, is—

1. In a disconnecting device for shaft-couplings, the combination with a drive-shaft and a shaft to be driven, of the coupling members carried respectively by said shafts, means for connecting said coupling members to cause them to rotate in unison, and a cone longitudinally movable on the driving-shaft and arranged to engage and free the connecting means of the coupling members, substantially as described.

2. In a disconnecting device for shaft-couplings, the combination with a drive-shaft and a shaft to be driven, of the coupling members carried respectively by said shafts, pawls pivoted to one of said members and arranged to interlock with the other member to cause both members to rotate in unison, and a cone longitudinally movable on the driving-shaft and arranged to engage the free ends of said pawls to move them out of contact with the coupling member, substantially as described.

3. In a disconnecting device for shaft-couplings, the combination with a drive-shaft and a shaft to be driven, of coupling members carried respectively by said shafts, pawls pivoted to one of said members and arranged to interlock with the other member, said pawls having inclined ends, and a cone longitudinally movable on the driving-shaft and arranged to contact with the said inclined ends of the pawls to move them out of contact with the coupling member, substantially as described.

4. In a disconnecting device for shaft-couplings, the combination with a drive-shaft and a shaft to be driven, of the coupling members carried respectively by said shafts, means for connecting said coupling members to cause them to rotate in unison with the driven shaft, a spring-actuated cone mounted to move longitudinally on the driving-shaft and arranged to engage and free the connecting means of the coupling members, and means for holding said cone retracted under tension, substantially as described.

5. In a disconnecting device for shaft-couplings, the combination with a drive-shaft and a shaft to be driven, of coupling members carried respectively by said shafts, pawls pivoted to one of said members and arranged to interlock with the other member to cause both members to rotate in unison, a longitudinally-movable spring-actuated cone on the driving-shaft arranged to engage the free ends of said pawls to move them out of contact with the coupling member, means for holding said cone retracted under the tension of the spring, and means for releasing said cone to permit the same to move longitudinally on the shaft under the action of the spring and to engage the pivoted pawls, for the purpose described.

6. In a disconnecting device for shaft-couplings, the combination with a drive-shaft and a shaft to be driven, of coupling members carried respectively by said shafts, means for connecting said members to cause them to rotate in unison, a longitudinally-movable disconnecting-cone freely mounted on the drive-shaft, a spring normally acting to move the cone toward the clutch members for the purpose specified, links arranged to engage the cone to hold the same retracted under the tension of the spring, and levers for retaining and releasing said links to free the cone, substantially as described.

In testimony whereof I have hereunto set my hand in the presence of two witnesses.

CASPER VAN GYN.

Witnesses:
LUCAS NICOLAAS ALTA,
HENRI JEAN CORNEILLE.